(12) United States Patent
Kim et al.

(10) Patent No.: US 12,269,338 B2
(45) Date of Patent: Apr. 8, 2025

(54) APPARATUS AND METHOD FOR CONTROLLING VEHICLE USING ROTATION INFORMATION OF MOBILE TERMINAL

(71) Applicant: HYUNDAI MOBIS CO., LTD., Seoul (KR)

(72) Inventors: Tae Hun Kim, Seongnam-si (KR); Sung Joon Ahn, Seoul (KR); Myung Bin Choi, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 755 days.

(21) Appl. No.: 17/380,659

(22) Filed: Jul. 20, 2021

(65) Prior Publication Data

US 2022/0024312 A1   Jan. 27, 2022

(30) Foreign Application Priority Data

Jul. 22, 2020 (KR) .................. 10-2020-0091142

(51) Int. Cl.
*B60K 35/00* (2024.01)
*B60K 35/60* (2024.01)
*B60K 35/80* (2024.01)
*B60K 35/81* (2024.01)
*B60W 40/08* (2012.01)
(Continued)

(52) U.S. Cl.
CPC ............ *B60K 35/00* (2013.01); *B60W 40/08* (2013.01); *H04M 1/72454* (2021.01); *B60K 35/60* (2024.01); *B60K 35/654* (2024.01); *B60K 35/80* (2024.01); *B60K 35/81* (2024.01);
(Continued)

(58) Field of Classification Search
CPC ...... B60K 35/00; B60K 35/60; B60K 35/654; B60K 35/80; B60K 35/81; B60K 2360/573; B60K 2360/782; B60K 2360/111; B60K 2360/164; B60K 2360/166; B60K 2360/182; B60K 2360/47; B60K 2360/569; B60K 2360/834; B60K 35/10; B60K 35/22; B60K 35/28; B60K 35/29; B60K 35/50; B60W 40/08; B60W 2540/215; B60W 50/14; B60W 50/10; B60W 2050/0005; B60W 2050/0064; H04M 1/72454; H04M 1/724098; H04M 1/72442; B60R 11/02; B60R 2011/001
See application file for complete search history.

(56) References Cited

U.S. PATENT DOCUMENTS

2016/0284059 A1* 9/2016 Gonzalez Solis ......... G06F 3/01
2018/0124233 A1* 5/2018 Abramson ............ H04W 12/30
(Continued)

*Primary Examiner* — Ashley L Redhead, Jr.
(74) *Attorney, Agent, or Firm* — NovoTechIP International PLLC

(57) ABSTRACT

The present invention relates to an apparatus and method for controlling a vehicle using rotation information of a mobile terminal. The apparatus for controlling a vehicle using rotation information of a mobile terminal includes an input unit configured to receive rotation information of a mobile terminal, a memory configured to store a program for controlling a vehicle based on the rotation information, and a processor configured to execute the program, wherein the processor recognizes a view mode of the mobile terminal from the rotation information and provides a vehicle control screen according to the view mode.

12 Claims, 17 Drawing Sheets

(51) Int. Cl.
*H04M 1/72454* (2021.01)
*B60K 35/65* (2024.01)

(52) U.S. Cl.
CPC .. *B60K 2360/573* (2024.01); *B60K 2360/782* (2024.01); *B60W 2540/215* (2020.02)

(56) References Cited

U.S. PATENT DOCUMENTS

| | | | | |
|---|---|---|---|---|
| 2020/0041992 | A1* | 2/2020 | Nagashima | G06F 3/04847 |
| 2021/0356279 | A1* | 11/2021 | Szigeti | G01C 21/3407 |
| 2022/0024312 | A1* | 1/2022 | Kim | B60K 35/29 |
| 2024/0294115 | A1* | 9/2024 | Komatsu | B60K 37/20 |

* cited by examiner

200

| CLUSTER AREA | NAVIGATION/ROUTE |  |

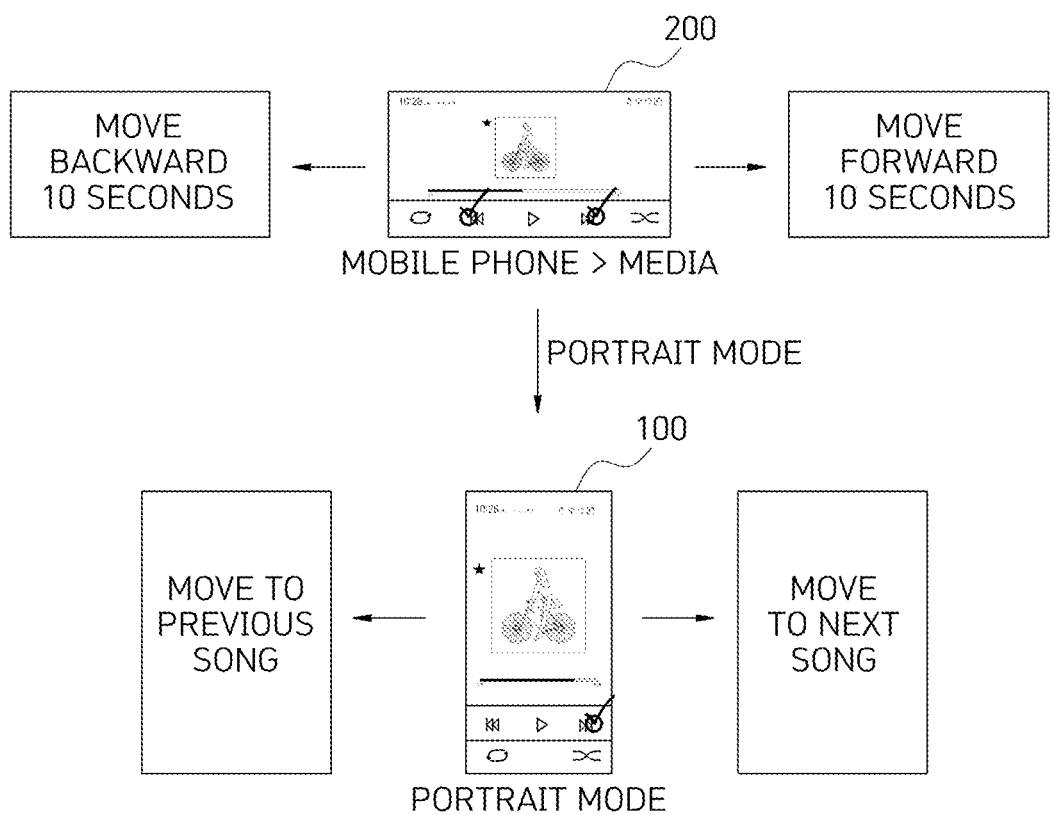

APPARATUS AND METHOD FOR CONTROLLING VEHICLE USING ROTATION INFORMATION OF MOBILE TERMINAL

CROSS-REFERENCE TO RELATED APPLICATIONS

This application claims priority to and the benefit of Korean Patent Application No. 10-2020-0091142, filed on Jul. 22, 2020, the disclosure of which is incorporated herein by reference in its entirety.

BACKGROUND OF THE INVENTION

1. Field of the Invention

The present invention relates to an apparatus and method for controlling a vehicle using rotation information of a mobile terminal.

2. Discussion of Related Art

In mobile terminals, sensors are disposed to provide a landscape mode or a portrait mode according to rotation of the mobile terminal.

According to the related art, a technique in which navigation information is displayed on a mobile terminal mounted on a steering wheel of a vehicle is proposed, but there is a problem in that a function operation screen and an information providing screen cannot be simultaneously supported according to rotation of the mobile terminal, that is, a landscape/portrait mode.

BRIEF SUMMARY OF THE INVENTION

The present invention is directed to providing an apparatus and method capable of simultaneously supporting a function operation screen and an information providing screen according to rotation (landscape/portrait mode) of a mobile terminal mounted on a steering wheel and capable of providing a user experience (UX) to facilitate function manipulation and information recognition according to the rotation of the mobile terminal and a state of a screen.

According to an aspect of the present invention, there is provided an apparatus for controlling a vehicle using rotation information of a mobile terminal, which includes an input unit configured to receive rotation information of a mobile terminal, a memory configured to store a program for controlling a vehicle based on the rotation information, and a processor configured to execute the program. The processor recognizes a view mode of the mobile terminal from the rotation information and provides a vehicle control screen image according to the view mode.

When the mobile terminal is fixedly mounted on a steering wheel and is rotated together with the steering wheel according to rotation of the steering wheel, the processor may check an intention of a driver to rotate the mobile terminal in consideration of manipulation information about the steering wheel and determine whether to change the view mode according to the checked intention.

The processor may perform a function for focusing on an area of an in-vehicle display in a landscape mode.

The processor may change a display screen rendered in the landscape mode and a display screen rendered in a portrait mode according to the rotation information, wherein, in the portrait mode, the processor may transmit a command signal to display a screen for operating a vehicle function selected in the landscape mode.

When a landscape or portrait mode is set according to the rotation information, the processor may control necessary information, which is distinguished from information displayed on an in-vehicle display screen, to be displayed on a screen of the mobile terminal.

The processor may provide functions for changing a playback time of a media file and moving a media file in a list according to a change of the view mode due to the rotation information.

The processor may display a control screen image for a category of a first function from among a plurality of functions for an in-vehicle device in the landscape mode and display a control screen image for a category of a second function from among the plurality of functions for the in-vehicle device in the portrait mode according to the change of the view mode due to the rotation information.

The processor may allow a screen of the mobile terminal to be automatically changed to a preset function screen according to the change of the view mode due to the rotation information.

According to an aspect of the present invention, there is provided a method of controlling a vehicle using rotation information of a mobile terminal, which includes an operation (a) of recognizing an operation state of a mobile terminal, an operation (b) of rendering a user interface (UI) for vehicle control according to a view mode of the mobile terminal, and an operation (c) of performing vehicle control in conjunction with the mobile terminal.

The operation (a) may include recognizing rotation information of the mobile terminal, determining a landscape mode or a portrait mode, checking an intention of a driver to rotate the mobile terminal in consideration of rotation information of a steering wheel, and determining whether to change the view mode according to the checked intention.

The operation (b) may include changing a display screen rendered in the landscape mode and a display screen rendered in the portrait mode according to the operation state of the mobile terminal and, in the portrait mode, rendering a screen for operating a vehicle function selected in the landscape mode.

The operation (b) may include displaying necessary information, which is distinguished from information displayed on a display screen according to the view mode, on a screen of the mobile terminal.

The operation (b) may include providing functions for changing a playback time of a media file and moving a media file in a list according to a change of the view mode.

The operation (b) may include displaying a control screen image for a category of a first function from among a plurality of functions for an in-vehicle device in the landscape mode and displaying a control screen image for a category of a second function from among the plurality of functions for the in-vehicle device in the portrait mode according to the change of the view mode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 4A to 4C illustrate manipulation of a media function according to a change of a view mode of a mobile terminal according to an embodiment of the present invention;

DETAILED DESCRIPTION OF THE INVENTION

The above-described objects, other objects, advantages, and features of the present invention and methods of achieving the same will be clearly understood with reference to the accompanying drawings and the following detailed embodiments.

However, the present invention is not limited to the embodiments to be disclosed below but may be implemented in various different forms. The following embodiments are merely provided to easily inform those skilled in the art of the objects, configuration, and effects of the present invention. The scope of the present invention is defined by the appended claims.

Meanwhile, the terms used herein are provided only to describe the embodiments of the present invention and not for purposes of limitation. In this specification, the singular forms include the plural forms unless the context clearly indicates otherwise. It will be understood that the terms "comprise" and/or "comprising," when used herein, specify some stated components, steps, operations and/or elements but do not preclude the presence or addition of one or more other components, steps, operations and/or elements.

Figure 1:
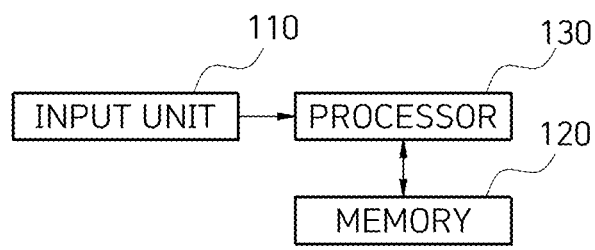
FIG. 1 illustrates an apparatus for controlling a vehicle using rotation information of a mobile terminal according to an embodiment of the present invention.

FIG. 1 illustrates an apparatus for controlling a vehicle using rotation information of a mobile terminal according to an embodiment of the present invention.

There is an advantage in that a mobile terminal in a landscape mode provides a horizontally wide screen and is mirrored with a display placed in a front portion of a vehicle to conveniently exchange information.

There is an advantage in that the mobile terminal in a portrait mode is convenient in situations in which information manipulation, keyboard input, and voice recognition are performed.

The apparatus for controlling a vehicle using rotation information of a mobile terminal according to the embodiment of the present invention includes an input unit 110 that receives the rotation information of the mobile terminal, a memory 120 in which a program for controlling a vehicle based on the rotation information is stored, and a processor 130 that executes the program. The processor 130 recognizes a view mode of the mobile terminal from the rotation information and provides a vehicle control screen image according to the view mode.

When the mobile terminal is fixedly mounted on a steering wheel and is rotated together with the steering wheel according to rotation of the steering wheel, the processor 130 checks an intention of a driver to rotate the mobile terminal in consideration of manipulation information of the steering wheel and determines whether to change the view mode according to the checked intention.

The processor 130 performs a function for focusing on an area of an in-vehicle display in a landscape mode.

The processor 130 changes a display screen rendered in the landscape mode and a display screen rendered in a portrait mode according to the rotation information. In the portrait mode, the processor 130 transmits a command signal to display a screen for manipulating a vehicle function selected in the landscape mode.

When the landscape or portrait mode is set according to the rotation information, the processor 130 controls necessary information, which is distinguished from information displayed on an in-vehicle display screen, to be displayed on a screen of the mobile terminal.

The processor 130 provides functions for changing a playback time of a media file and moving a media file in a list according to a change of the view mode due to the rotation information.

The processor 130 displays a control screen image for a category of a first function from among a plurality of functions for an in-vehicle device in the landscape mode and displays a control screen image for a category of a second function from among the plurality of functions for the in-vehicle device in the portrait mode according to the change of the view mode due to the rotation information.

The processor 130 allows the screen of the mobile terminal to be automatically changed to a preset function screen according to the change of the view mode due to the rotation information.

Figure 2A:
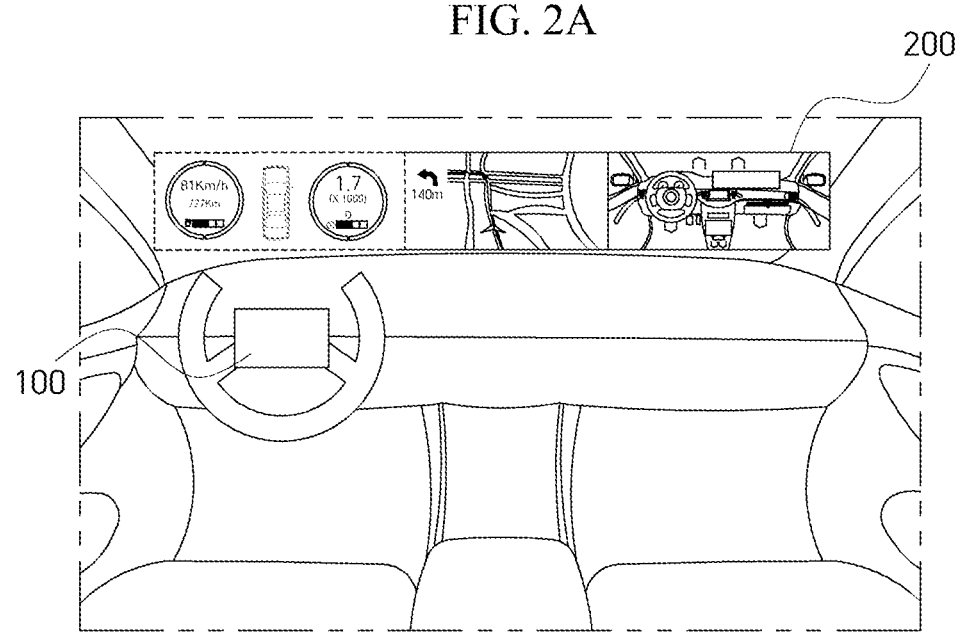
FIGS. 2A to 2C illustrate screens according to a mobile terminal in landscape/portrait modes when a display cluster area is manipulated using the mobile terminal according to an embodiment of the present invention.
Figure 2B:
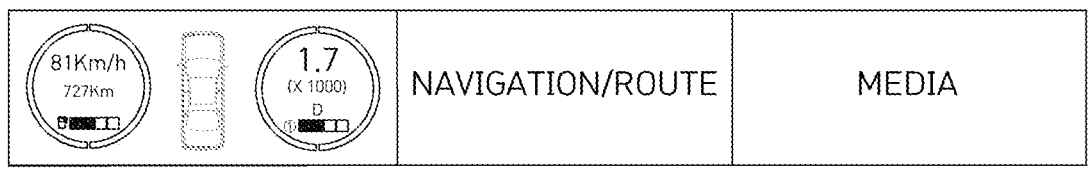
Figure 2C:
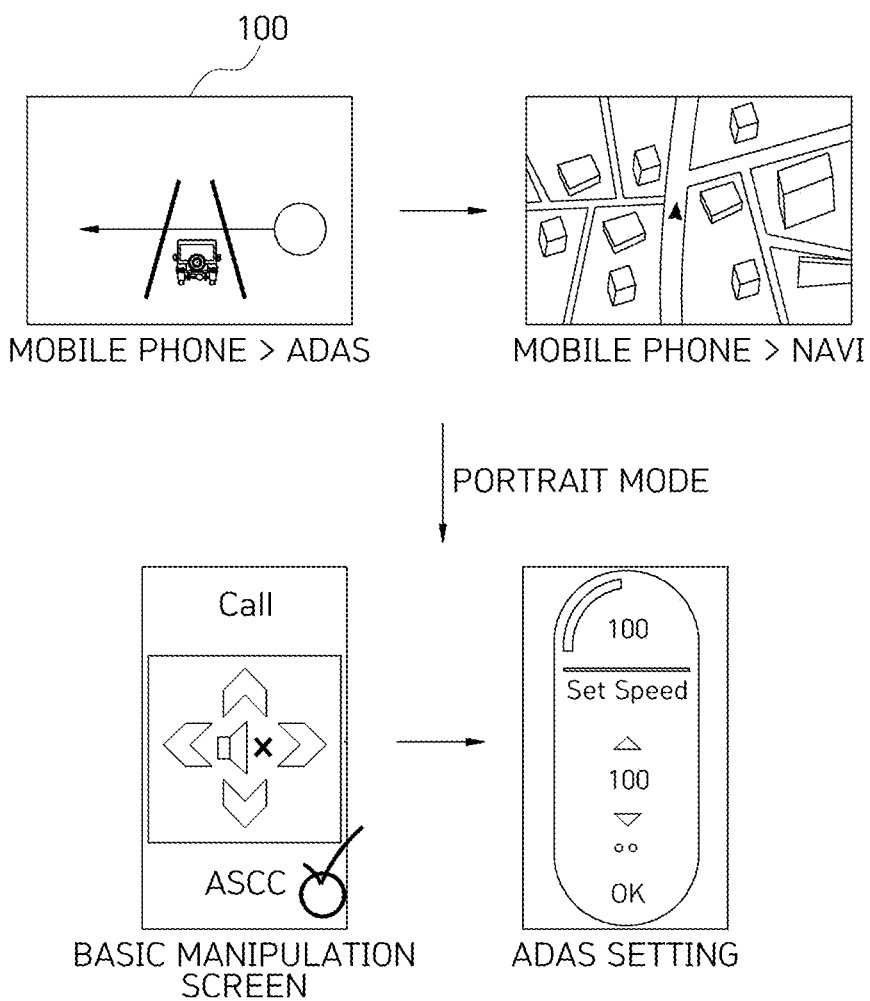

FIGS. 2A to 2C illustrate screens according to a mobile terminal in landscape/portrait modes when a display cluster area is manipulated using the mobile terminal according to an embodiment of the present invention.

A display 200 area is divided into a cluster area for displaying driving information such as a revolutions per minute (RPM), a speed, and the like, a navigation/route area for displaying navigation information, and an area for displaying an in-vehicle function or media information.

Among the plurality of areas of the display 200, a focused area is determined by a drag signal input to a mobile terminal 100, a movement command signal using a separate physical button provided in the vehicle, a voice signal, or the like.

As illustrated in FIG. 2A, when the cluster area is focused, vehicle driving information displayed on the cluster area is displayed on a screen of the mobile terminal 100 in conjunction with the display 200.

Referring to FIG. 2C, when a drag signal is input from the mobile terminal 100 in a landscape mode, movement of a screen view for a function control screen image of advanced driver-assistance systems (ADAS), a navigation screen, or the like is performed.

Referring to FIG. 2C, when the mobile terminal 100 is rotated to enter portrait mode, display information different from display information that has been shown in the landscape mode is displayed.

For example, activation information about a lane keeping assist system (LKAS) or the like of an ADAS function currently being performed may be displayed on an ADAS screen in the landscape mode, and when the mode is changed to the portrait mode, a basic manipulation screen of the ADAS may be displayed.

When an advanced smart cruise control (ASCC) area is touched in the mobile terminal 100 in the portrait mode, a screen for setting an ASCC speed is provided and, in the mobile terminal 100 in the portrait mode, it is possible to set a call, a channel, and a volume in addition to the ADAS.

That is, in the landscape mode of the mobile terminal 100, it is possible to perform internal manipulation such as movement of a screen view for a display area and, in the portrait mode of the mobile terminal 100, a screen in which a function is manipulated based on the area focused on the display is displayed.

Figure 3A:
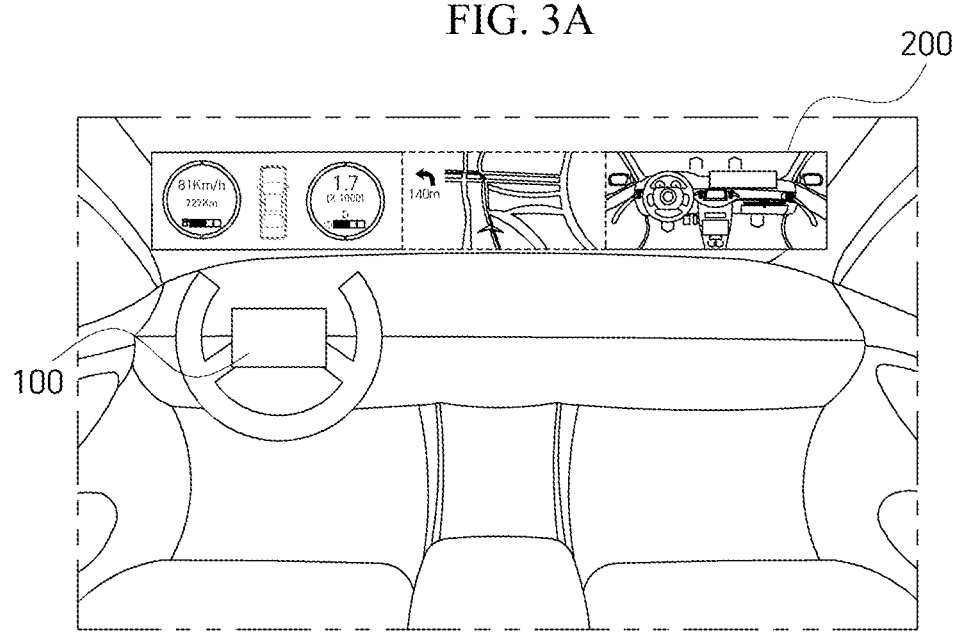
FIGS. 3A to 3C illustrate necessary information divided for and displayed on a display and a mobile terminal according to a change of a view mode of the mobile terminal according to an embodiment of the present invention.
Figure 3B:
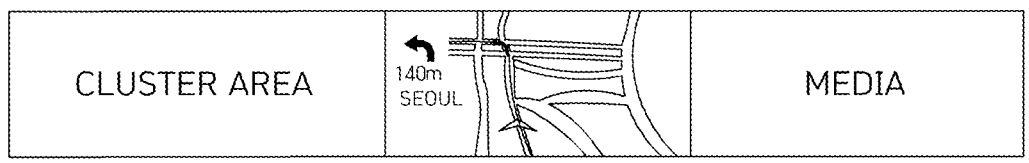
Figure 3C:
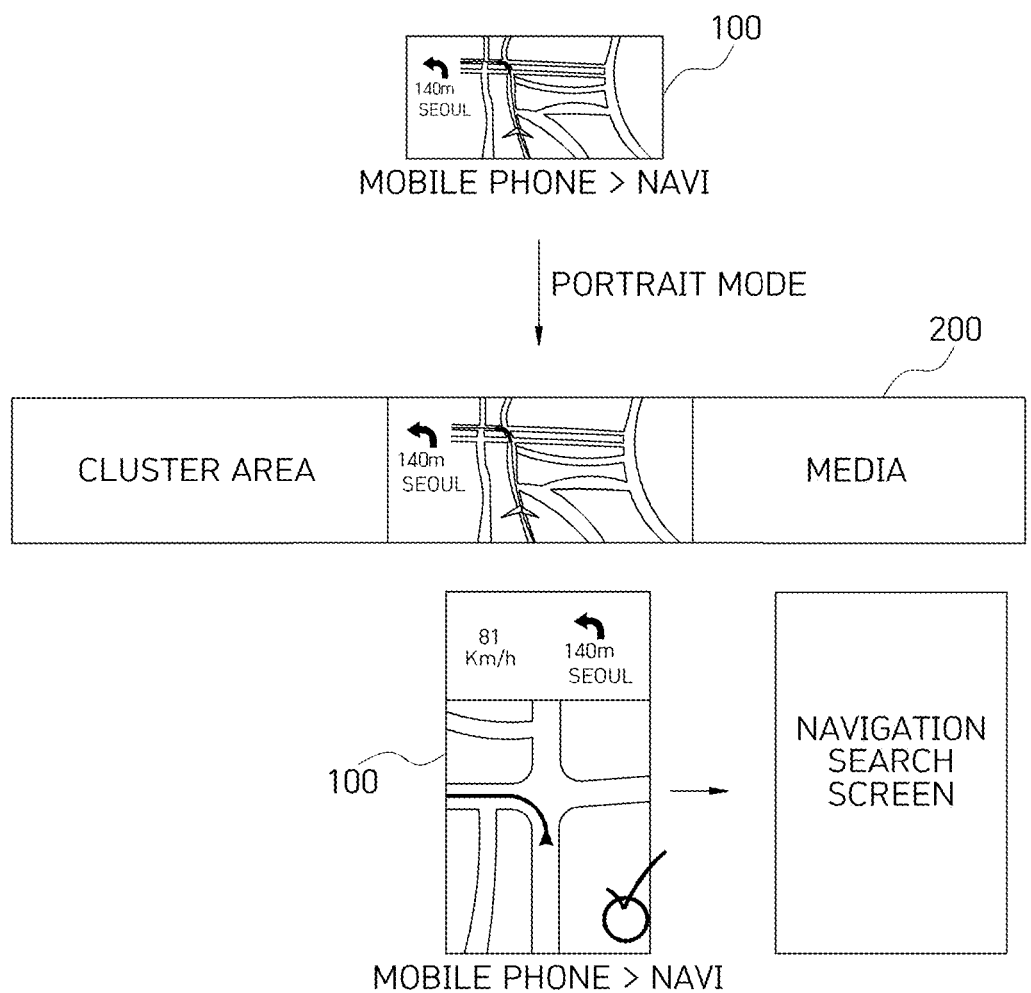

FIGS. 3A to 3C illustrate necessary information divided for and displayed on a display and a mobile terminal according to a change of a view mode of the mobile terminal according to an embodiment of the present invention.

It is assumed that a focus is on an application area (referring to FIGS. 3A to 3C, a navigation area) of a display 200 area.

When a mobile terminal 100 in conjunction with the display 200 is in a landscape mode, navigation route information, current driving speed information, etc. are displayed on the application area of the display 200, and map information and current vehicle location information are displayed on a screen of the mobile terminal 100.

When the mobile terminal 100 in conjunction with the display 200 is changed to a portrait mode, the navigation route information, the current driving speed information, etc. are displayed on the screen of the mobile terminal 100, and the map information and the current vehicle location information are displayed on the application area of the display 200.

As the landscape/portrait mode is changed according to rotation of the mobile terminal 100, it is possible to perform a zoom in/out function on a navigation screen, information is exchanged between the display 200 and the mobile terminal 100, and necessary information is divided for and displayed on the display 200 and the mobile terminal 100.

Since text is input more easily in the portrait mode than in the landscape mode, when a touch signal for a specific area is input in the portrait mode, a navigation search screen is displayed.

Figure 4A:
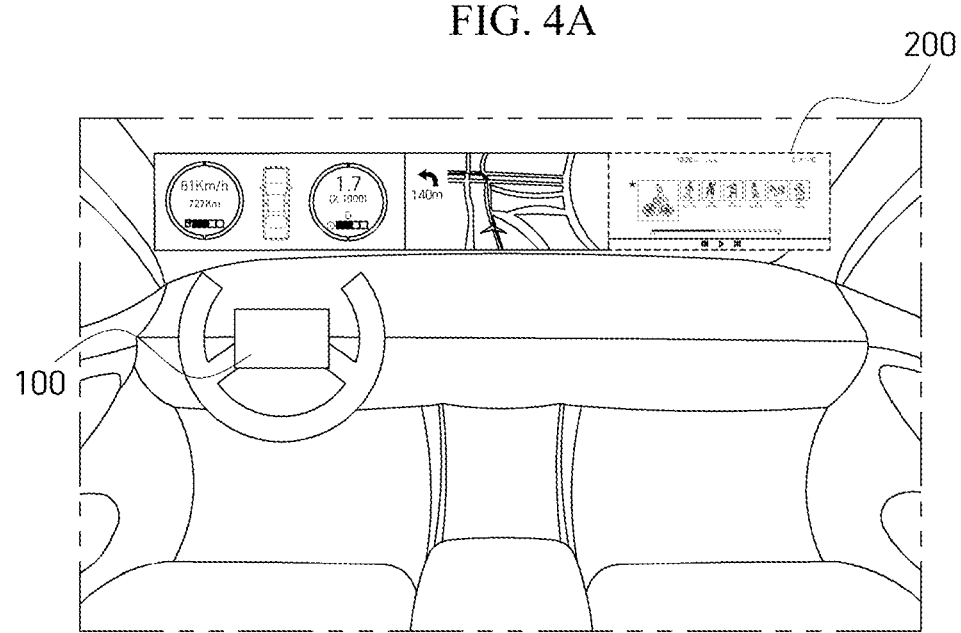
Figure 4B:
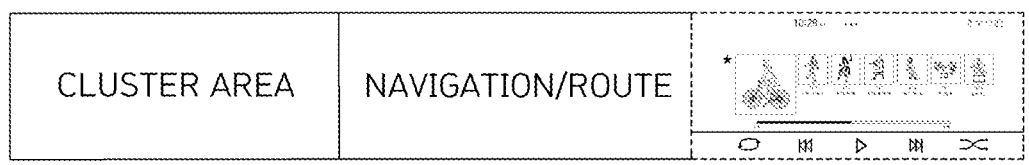

FIGS. 4A to 4C illustrate manipulation of a media function according to a change of a view mode of a mobile terminal according to an embodiment of the present invention.

It is assumed that a focus is on a media area of a display 200 area.

When a mobile terminal 100 in conjunction with the display 200 is in a landscape mode, a playback time of a corresponding media file is moved forward by a preset time (e.g., 10 seconds) when a ">>" button on a screen of the mobile terminal 100 is clicked, and the playback time of the corresponding media file is moved backward by a preset time (e.g., 10 seconds) when a "<<" button is clicked. In addition, it is possible to move a position of the playback time in the media file by dragging a progress bar.

When the mobile terminal 100 in conjunction with the display 200 is changed to a portrait mode, a song selection is moved to a next song in a list (or in the case of radio, the position is moved to a next set frequency) when the ">>" button on the screen of the mobile terminal 100 is clicked, and the song selection is moved to a previous song (in the case of radio, the position is moved to a previous set frequency) when the "<<" button is clicked. In the portrait mode, a song selection is supported and a screen for a song list and menu selection is provided.

Figure 5A:
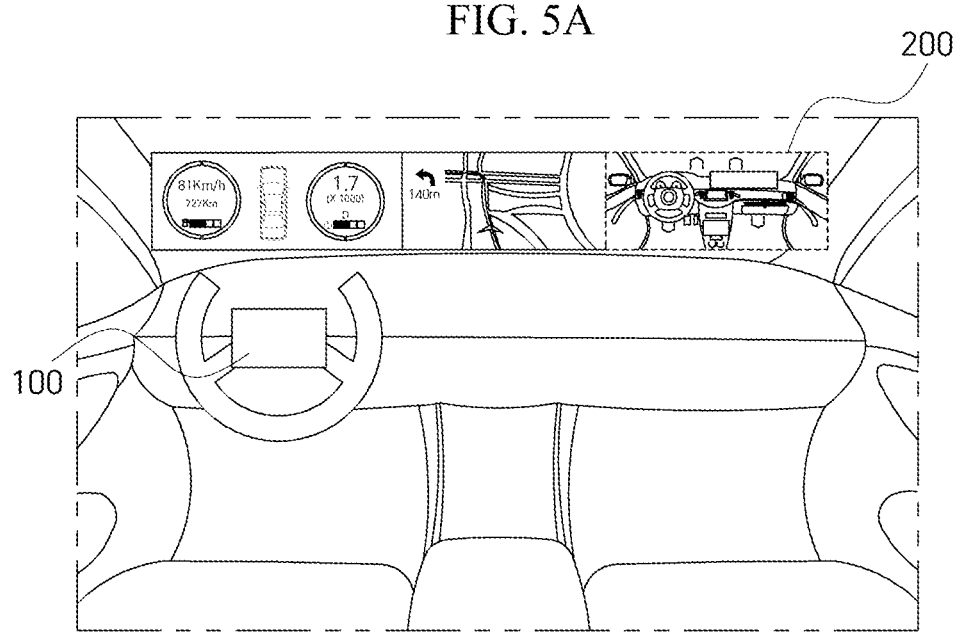
FIG. 5A to 5C illustrate screens for performing a distributed air conditioner function according to a change of a view mode of a mobile terminal according to an embodiment of the present invention.
Figure 5B:
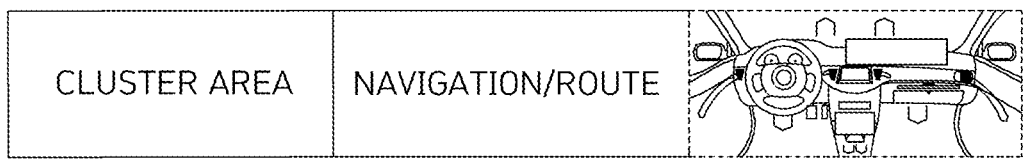
Figure 5C:
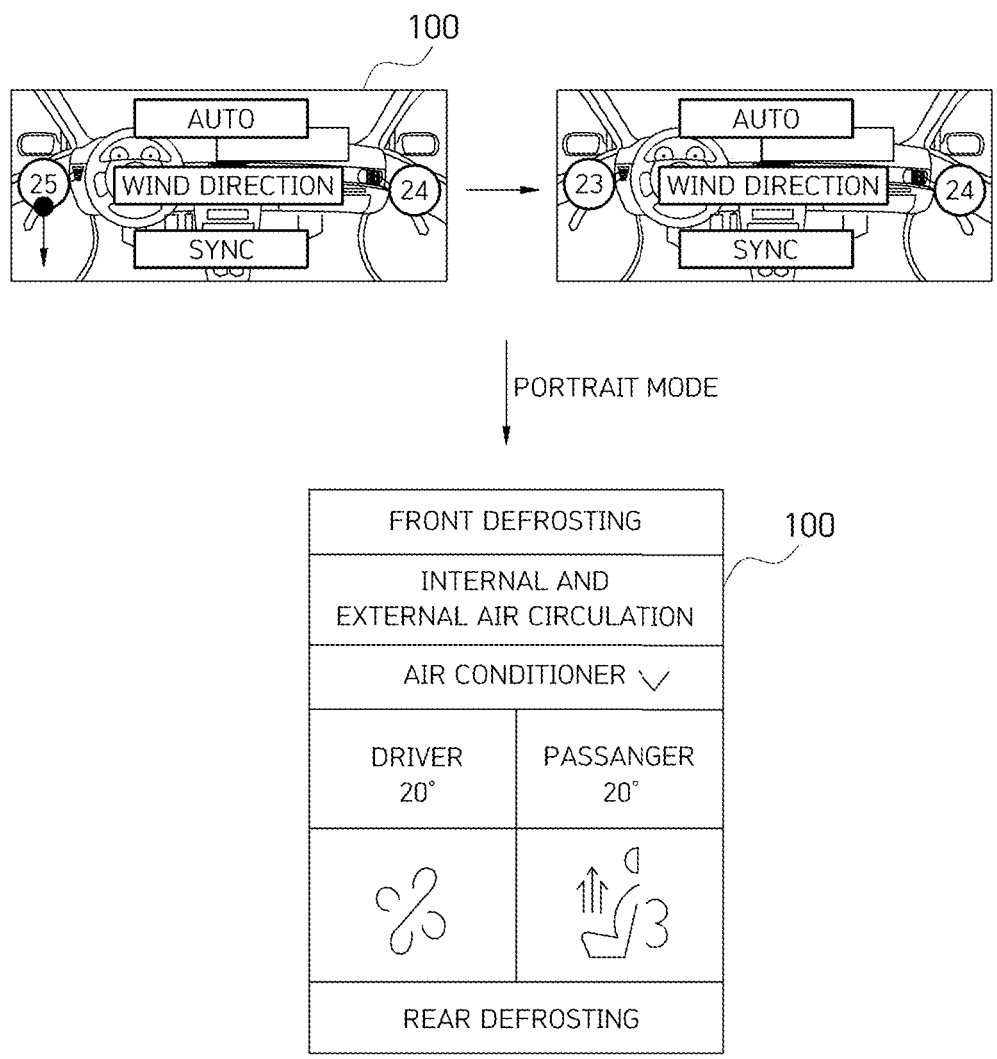

FIG. 5A to 5C illustrate screens for performing a distributed air conditioner function according to a change of a view mode of a mobile terminal according to an embodiment of the present invention.

It is assumed that a focus is on an in-vehicle function area (air conditioner area) in a display 200 area.

When a mobile terminal 100 in conjunction with the display 200 is in a landscape mode, it is possible to control an automatic function, a wind direction, a driver's seat set temperature, a front passenger's seat set temperature, and a synchronization function using the mobile terminal 100. For example, it is possible to lower the set temperature from 25 degrees to 23 degrees by adjusting the driver's seat set temperature.

When the mobile terminal 100 in conjunction with the display 200 is changed to a portrait mode, defrosting, seat temperature adjustment, driver's seat temperature information, and passenger's seat temperature information are displayed on the mobile terminal.

In the portrait mode, it is possible to perform front defrosting and rear defrosting and adjust seat temperature.

Figure 6:
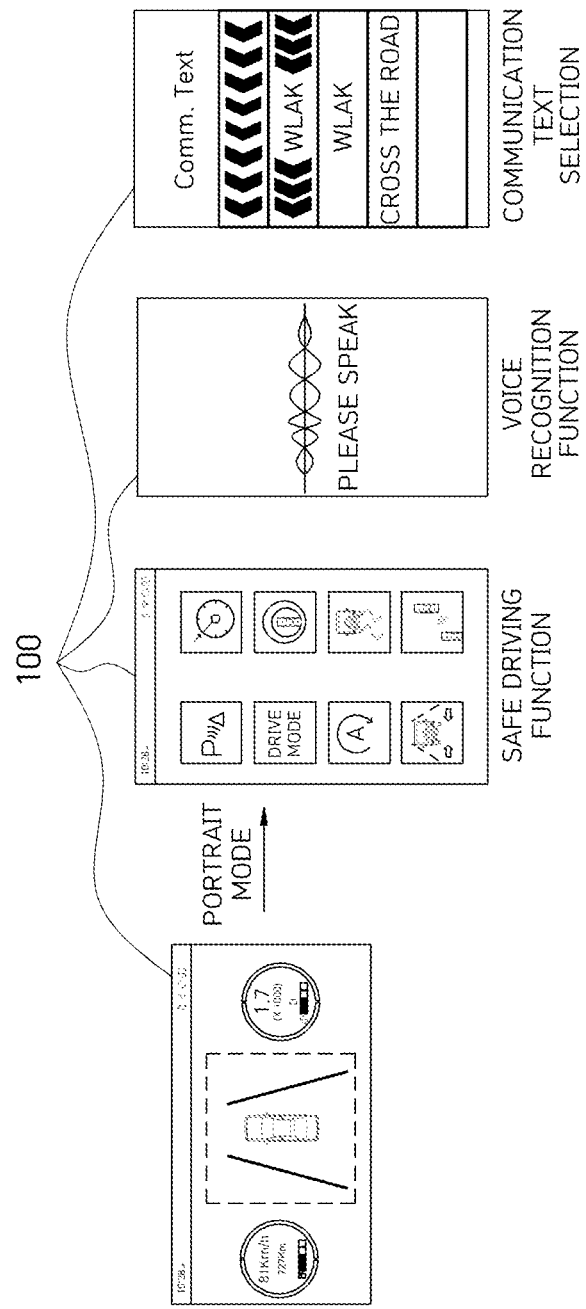
FIG. 6 illustrates a process of changing to a preset function operation screen according to a change of a view mode of a mobile terminal according to an embodiment of the present invention.

FIG. 6 illustrates a process of changing to a preset function operation screen according to a change of a view mode of a mobile terminal according to an embodiment of the present invention.

In a landscape mode, a mobile terminal 100 in conjunction with a display 200 displays driving information in a cluster area.

In this case, when the mobile terminal 100 is rotated and changed to a portrait mode, a screen of the mobile terminal 100 is changed to a screen for controlling a preset function.

For example, the screen of the mobile terminal 100 may be changed to a screen for controlling safe driving functions such as drive mode setting, automatic hold setting, rear side detection, and the like, changed to a screen for performing a voice recognition function, or changed to a screen for selecting communication text.

On the screen for selecting the communication text, it is possible to select a message to be transmitted to an outside driver or pedestrian and, for example, it is possible to select a message that means crossing a crosswalk or a message that means crossing a street to be transmitted.

Figure 7A:
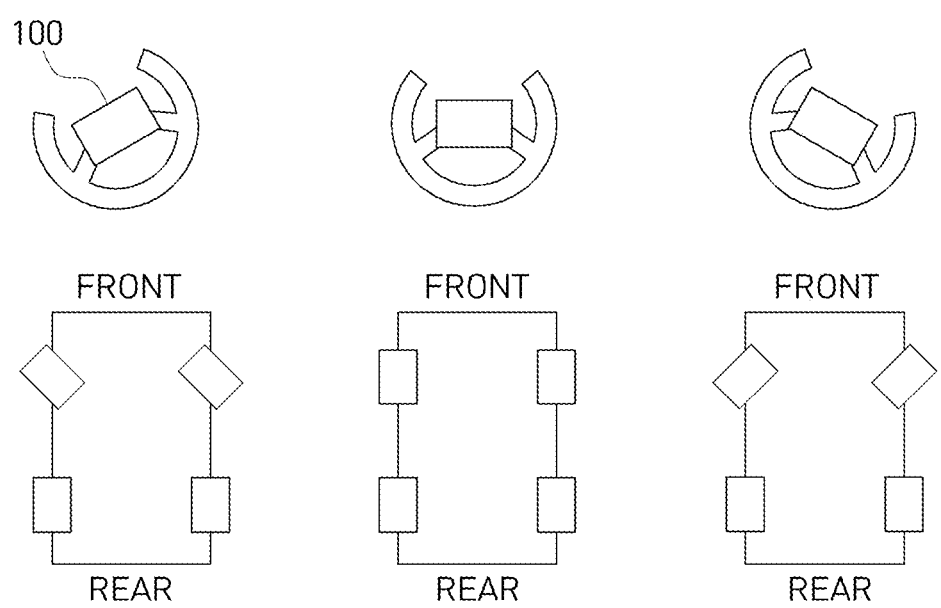
FIGS. 7A and 7B illustrate rotation of a mobile phone placed on a steering wheel.
Figure 7B:
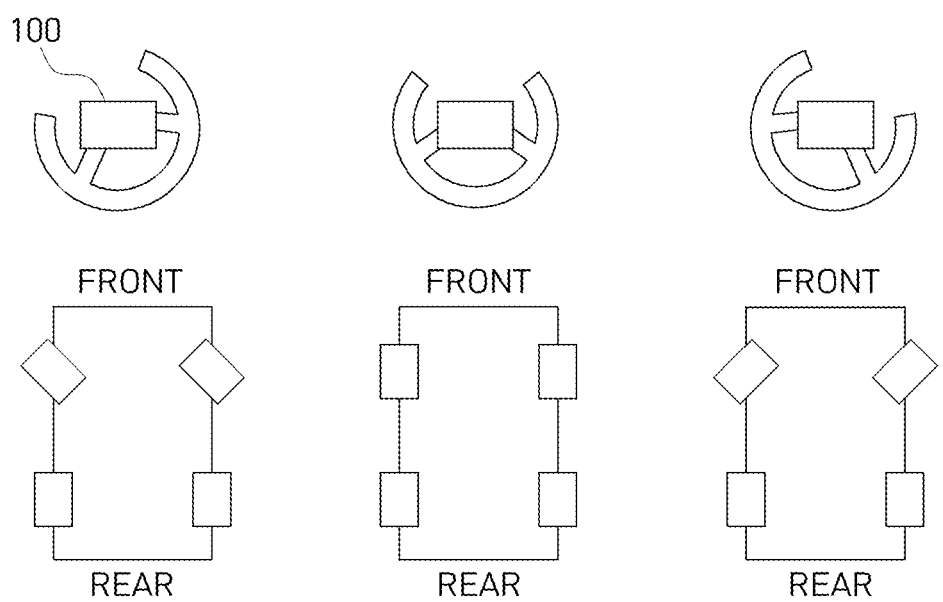

FIGS. 7A and 7B illustrate rotation of a mobile phone placed on a steering wheel.

According to an embodiment of the present invention, a magnet which is fixedly installed on an inner surface of a steering wheel of a vehicle to fix a mobile terminal onto an upper portion of the steering wheel, which is another surface, using a magnetic force thereof is provided. A wireless charging unit for charging a battery of the mobile terminal using wireless power may be provided in the steering wheel. The mobile terminal is connected to an in-vehicle network through short-distance communication.

Referring to FIG. 7A, the mobile terminal mounted on the steering wheel of the vehicle is rotated by a rotation angle of the steering wheel. In this case, the mobile terminal receives operation state information of the steering wheel through communication with the in-vehicle network, and when the mobile terminal is rotated by the rotation of the steering wheel, a preset view mode is maintained without changing a landscape/portrait mode of the mobile terminal. For example, when a driver drives a vehicle to make a U-turn, the steering wheel will be turned leftward about two times. However, since the rotation of the mobile terminal generated at this time is not caused by the intention of the driver to change the view mode but is caused by the rotation of the steering wheel on which the mobile terminal is mounted, the view mode is not changed according to the operation state information (rotation information) of the steering wheel even when the mobile terminal is rotated.

According to another embodiment of the present invention, a mobile terminal mounting area is disposed above a central area of a steering wheel, and the central area of the steering wheel and the mobile terminal mounting area operate independently of each other. In this case, the central area of the steering wheel and the mobile terminal mounting area may be connected to each other through a groove and a ball and may operate independently of each other. A magnet is disposed on the mobile terminal mounting area and the mobile terminal is mounted on the magnet. As illustrated in FIG. 7B, since the central area of the steering wheel and the mobile terminal mounting area operate independently of each other, the mobile terminal mounting area is maintained without rotation even when the steering wheel is rotated. In this case, as described above, the landscape/portrait mode of the mobile terminal is changed according to its own rotation information without receiving the rotation information of the steering wheel.

Figure 8:
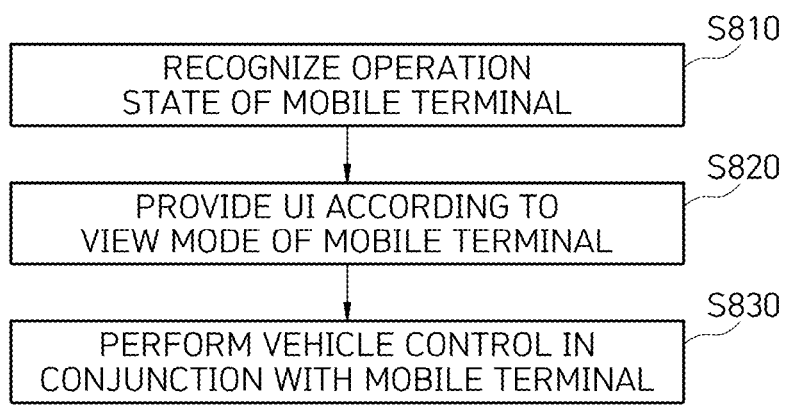
FIG. 8 illustrates a method of controlling a vehicle using rotation information of a mobile terminal according to an embodiment of the present invention.

FIG. 8 illustrates a method of controlling a vehicle using rotation information of a mobile terminal according to an embodiment of the present invention.

The method of controlling a vehicle using rotation information of a mobile terminal according to the present invention includes operations of recognizing an operation state of the mobile terminal (S810), rendering a user interface (UI) for vehicle control according to a view mode of the mobile terminal (S820), and performing vehicle control in conjunction with the mobile terminal (S830).

In operation S810, rotation information of the mobile terminal is recognized and a landscape mode or a portrait mode is determined, an intention of a driver to rotate the mobile terminal is checked in consideration of rotation information of a steering wheel, and whether to change the view mode is determined according to the checked intention.

In operation S820, a display screen rendered in the landscape mode and a display screen rendered in the portrait mode are changed according to an operation state of the mobile terminal, wherein, in the portrait mode, a screen for operating a vehicle function selected in the landscape mode is provided.

In operation S820, necessary information, which is distinguished from information displayed on a display screen according to the view mode, is displayed on a screen of the mobile terminal.

In operation S820, functions for changing a playback time of a media file and moving a media file in a list are provided according to a change of the view mode.

In operation S820, according to the change of the view mode, a control screen for a category of a first function from among a plurality of functions for an in-vehicle device is displayed in the landscape mode and a control screen image for a category of a second function from among the plurality of functions for the in-vehicle device is displayed in the portrait mode.

Meanwhile, the method of controlling a vehicle using rotation information of a mobile terminal according to the embodiment of the present invention may be implemented in a computer system or recorded on a recording medium. The computer system may include at least one processor, a memory, a user input device, a data communication bus, a user output device, and a storage. The above-described components perform data communication through the data communication bus.

The computer system may further include a network interface coupled to a network. The processor may include a central processing unit (CPU) or a semiconductor device that processes instructions stored in the memory and/or the storage.

The memory and the storage may include various types of volatile or nonvolatile storage media. For example, the memory may include a read only memory (ROM) and a random access memory (RAM).

Therefore, the method of controlling a vehicle using rotation information of a mobile terminal according to the embodiment of the present invention may be implemented as a computer-executable method. When the method of controlling a vehicle using rotation information of a mobile terminal according to the embodiment of the present invention is performed in a computer device, computer-readable instructions may perform the method of controlling a vehicle according to the present invention.

Meanwhile, the method of controlling a vehicle using rotation information of a mobile terminal according to the present invention described above may be implemented as computer-readable code on a computer-readable recording medium. The computer-readable recording medium includes any type of recording medium in which data that may be read by a computer system is stored. For example, the computer-readable recording medium may include a ROM, a RAM, a magnetic tape, a magnetic disk, a flash memory, an optical data storage device, and the like. Further, the computer-readable recording medium may be distributed in computer systems connected through a computer communication network and may be stored and executed as code that may be read in a distributed manner.

According to the present invention, it is possible to provide a user experience (UX) so that a driver can easily manipulate vehicle functions and recognize information according to horizontal/vertical rotation of a mobile phone mounted on a steering wheel.

According to a landscape/portrait mode of a mobile phone, it is possible for a driver to classify and check necessary information according to the driving situation and purpose and it is possible to easily manipulate vehicle functions.

Effects of the present invention are not limited to the above-described effects and other effects which have not been described may be clearly understood by those skilled in the art from the above descriptions.

What is claimed is:

1. An apparatus for controlling a vehicle based on rotation information of a mobile terminal, the apparatus comprising:
a processor; and
a computer-readable medium in communication with the processor and storing instructions which, when executed by the processor, cause the processor to control the apparatus to perform:
receiving rotation information of a mobile terminal mounted on a steering wheel of the vehicle and configured to rotate alone or together with the steering wheel;
determining whether a rotation of the mobile terminal has occurred due to a rotation of the steering wheel;
in response to determining that the rotation of the mobile terminal has not occurred due to the rotation of the steering wheel, determining that a driver of the vehicle has intended to rotate the mobile terminal;

in response to determining that the driver of the vehicle has intended to rotate the mobile terminal, recognizing a view mode of the mobile terminal from the rotation information;

rendering a user interface (UI) for vehicle control according to the view mode of the mobile terminal; and performing vehicle control in conjunction with the mobile terminal.

2. The apparatus of claim 1, wherein the instructions, when executed by the processor, further cause the processor to control the apparatus to perform focusing on an area of an in-vehicle display in a landscape mode.

3. The apparatus of claim 1, wherein the instructions, when executed by the processor, further cause the processor to control the apparatus to perform:

changing a display screen image rendered in a landscape mode and the display screen image rendered in a portrait mode according to the rotation information, and in the portrait mode, transmitting a command signal to display a screen image for operating a vehicle function selected in the landscape mode.

4. The apparatus of claim 1, wherein, when a landscape or portrait mode is set according to the rotation information, the instructions, when executed by the processor, further cause the processor to control the apparatus to perform displaying first information to be displayed on a screen of the mobile terminal, the first information being different from second information displayed on an in-vehicle display screen.

5. The apparatus of claim 1, wherein the instructions, when executed by the processor, further cause the processor to control the apparatus to perform:

displaying a first control screen image for a first category of a first function from a plurality of functions for an in-vehicle device in a landscape mode according to a change of the view mode due to the rotation information; and displaying a second control screen image for a second category of a second function from the plurality of functions for the in-vehicle device in a portrait mode according to the change of the view mode.

6. The apparatus of claim 1, wherein the instructions, when executed by the processor, further cause the processor to control the apparatus to perform allowing a screen image of the mobile terminal to be automatically changed to a preset function screen image according to a change to the view mode.

7. An apparatus for controlling a vehicle based on rotation information of a mobile terminal, the apparatus comprising:

a processor; and a computer-readable medium in communication with the processor and storing instructions which, when executed by the processor, cause the processor to control the apparatus to perform:

receiving rotation information of a mobile terminal;

recognizing a view mode of the mobile terminal from the rotation information;

rendering a user interface (UI) for vehicle control according to the view mode of the mobile terminal; and performing vehicle control in conjunction with the mobile terminal, wherein the instructions, when executed by the processor, further cause the processor to control the apparatus to perform providing a plurality of functions for changing a playback time of a first media file and moving a second media file in a list according to a change to the view mode.

8. A method of controlling a vehicle based on rotation information of a mobile terminal, the method comprising:

recognizing rotation information of a mobile terminal mounted on a steering wheel of the vehicle and configured to rotate alone or together with the steering wheel;

determining whether a rotation of the mobile terminal has occurred due to a rotation of the steering wheel;

in response to determining that the rotation of the mobile terminal has not occurred due to the rotation of the steering wheel, determining that a driver of the vehicle has intended to rotate the mobile terminal;

in response to determining that the driver of the vehicle has intended to rotate the mobile terminal, rendering a user interface (UI) for vehicle control according to a view mode of the mobile terminal; and performing vehicle control in conjunction with the mobile terminal.

9. The method of claim 8, wherein rendering the user interface (UI) for vehicle control comprises:

changing a display screen image rendered in a landscape mode and the display screen image rendered in a portrait mode according to the rotation information of the mobile terminal; and in the portrait mode, rendering a screen image for operating a vehicle function selected in the landscape mode.

10. The method of claim 8, wherein rendering the user interface (UI) for vehicle control comprises displaying necessary information, which is different from information displayed on a display screen according to the view mode, on a screen of the mobile terminal.

11. The method of claim 8, wherein rendering the user interface (UI) for vehicle control comprises:

displaying a first control screen image for a first category of a first function from among a plurality of functions for an in-vehicle device in a landscape mode, and displaying a second control screen image for a second category of a second function from among the plurality of functions for the in-vehicle device in a portrait mode according to a change to the view mode.

12. A method of controlling a vehicle based on rotation information of a mobile terminal, the method comprising:

recognizing an operation state of a mobile terminal;

rendering a user interface (UI) for vehicle control according to a view mode of the mobile terminal; and performing vehicle control in conjunction with the mobile terminal, wherein rendering the user interface (UI) for vehicle control comprises providing a plurality of functions for changing a playback time of a media file and moving a media file in a list according to a change to the view mode.

* * * * *